US007139751B1

(12) United States Patent
Enns

(10) Patent No.: US 7,139,751 B1
(45) Date of Patent: Nov. 21, 2006

(54) SEARCHING AND REUSING INFORMATION FROM PREVIOUSLY EXECUTED CONTROL INSTRUCTIONS IN A DATA FORWARDING DEVICE

(75) Inventor: Robert P. Enns, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 218 days.

(21) Appl. No.: 09/734,325

(22) Filed: Dec. 1, 2000

(51) Int. Cl.
*G06F 17/30* (2006.01)

(52) U.S. Cl. .............................. 707/4; 707/6; 345/156; 370/241

(58) Field of Classification Search .................... 707/3, 707/4, 6; 345/840, 156; 719/316; 703/20; 370/241
See application file for complete search history.

(56) References Cited

U.S. PATENT DOCUMENTS 6,018,342 A * 1/2000 Bristor ....................... 345/840

FOREIGN PATENT DOCUMENTS

WO WO 200157731 A2 * 8/2001

OTHER PUBLICATIONS

Unix On-Line Man Pages, School of Mathematics, Computing Department, Oct. 30, 1995.*
Levine et al., Unix for Dummies, Oct. 8, 1998, 4th Edition, pp. 67, 96-98, 200-201.*
Feibus, "Korn shell gems: aliasing and command history editing simplify command execution" (HP-UX) (column) (Tutorial), Jan. 1992HP Professional, v6, n1, p. 74 (4), ISSN: 0896-145X.*
Mallery, "Ultricks: third-party software tools bring useful capabilities to the Unix environment (a/Soft Development's nu/TPU text editor and Visix Software's Looking Glass graphical user interface)", Feb. 1992, Professional, v11, n2, p. 80 (2).*
Joe Habraken; "Practical Cisco Routers"; Sep. 1, 1999; Que, ISBN: 0-7897-2103-1.*
Scherer et al.; "Choosing the right Unix Shell: We take a look at the capabilities of four Unix shells and provide a useful quick reference"; May 1994; Unix; p. 105; vol. 11, No. 5.*
Sun Microsystems man pp. 1: Oct. 1998; User Commands; Sun Microsystems, Inc.: Part No. 805-3172-10.*
Burk et al.; "Unix System Administrator's Edition"; 1997; Sams Publishing.*
Marcus K. Baird, "What are the benefits of 4dos", Mar. 7, 1993, pp. 1-5.*
George C. Sackett, "Cisco Router Handbook", Jul. 1, 1999, Table of Contents and pp. 557-559.*
Jesper Pederen, Steve Moritsugu, *Practical UNIX*, Chapter 23: Introducing the Emacs Editor, pp. 625-650, (Dec. 1999).

* cited by examiner

*Primary Examiner*—Luke Wassum
*Assistant Examiner*—Gwen Liang
(74) *Attorney, Agent, or Firm*—Straub and Pokotylo; John C. Pokotylo

(57) ABSTRACT

A reverse-search function may accept user input and search back through previously executed and stored data forwarding device control instructions for a data forwarding device control instruction, at least a part of which matches a search string input by the user. The matching data forwarding device control instruction may be retrieved and rendered. A reverse-expand function may accept user input, and search back through previously executed and stored data forwarding device control instructions for a data forwarding device control instruction having an word or parameter, at least a part of which matches a search string input by the user. The first matching word or parameter may be retrieved and rendered.

18 Claims, 6 Drawing Sheets

SEARCHING AND REUSING INFORMATION FROM PREVIOUSLY EXECUTED CONTROL INSTRUCTIONS IN A DATA FORWARDING DEVICE

§ 1. BACKGROUND OF THE INVENTION

§ 1.1 Field of the Invention

The present invention concerns inputting and entering control instructions in data forwarding devices, such as routers for example. More specifically, the present invention concerns reusing information from previously executed control instructions for such a device.

§1.2 Related Art

The description of art in this section is not, and should not be interpreted to be, an admission that such art is prior art to the present invention. The present invention may be used for inputting control instructions for data forwarding devices.

Data forwarding devices, such as routers and switches, may be interconnected to form networks. The interconnections may be such that each data forwarding device has a plurality of input lines and a plurality of output lines. A basic function of these devices is to forward data received at their input lines to the appropriate output lines. Routers, for example, may determine the appropriate output lines based on a destination addresses contained in the received data and forwarding tables. Switches may be configured so that data received at input lines are provided to appropriate output lines.

Such data forwarding devices may need to be configured appropriately. This may be done by entering configuration commands, through a keyboard or other type of interface, into a data forwarding device. For example, a control instruction interface may be provided for configuring operating system software, configuring the device, and monitoring and/or troubleshooting software, network connectivity, and/or hardware. Other types of information or commands may also be entered into the device through the keyboard or interface.

When entering a command or information through a keyboard (or similar user interface) of a data forwarding device, there is a risk that the command or information may be entered incorrectly or incompletely. Such errors may cause the data forwarding device to be incorrectly configured and may lead to serious network malfunctions. This is especially true where the commands or information involve long strings of commands and complex number sequences.

Accordingly, there is a need to reduce the risk that commands or information will be entered incorrectly or incompletely.

§ 2. SUMMARY OF THE INVENTION

The disclosed invention helps users to input command instructions more efficiently and accurately by accepting user input, and if it is determined that a reverse-search is requested based on the accepted user input, then searching back through previously executed and stored data forwarding device control instructions for a data forwarding device control instruction, at least a part of which matches a search string input by the user. The matching data forwarding device control instruction may be retrieved and may be rendered.

The present invention may also provide a method for inputting a word or parameter of a control instruction for a data forwarding device. Such a method may accept user input, and if it is determined that a reverse-expand is requested based on the accepted user input, then searching back through previously executed and stored data forwarding device control instructions for a data forwarding device control instruction having an word or parameter, at least a part of which matches a search string input by the user. The first matching word or parameter may be retrieved and may be rendered.

The present invention may provide a control instruction interface having (a) a storage device for storing previously executed data forwarding device control instructions, (b) an input device for accepting user input; and (c) a reverse-search facility. The reverse-search facility may be adapted to accept user input from the input device, and determine whether a reverse-search is requested based on the accepted user input. If it is determined that a reverse-search is requested, then the reverse-search facility may search back through the previously executed data forwarding device control instructions stored in the storage device for a data forwarding device control instruction, at least a part of which matches a search string input by the user.

The control instruction interface may also, or alternatively, include a reverse-expand facility adapted to determine whether a reverse-expand is requested based on the accepted user input. If it is determined that a reverse-expand is requested, then the reverse-expand facility may search back through the previously executed data forwarding device control instructions stored in the storage device for a data forwarding device control instruction having a word or parameter, at least a part of which matches a search string input by the user.

§ 3. BRIEF DESCRIPTION OF THE DRAWINGS

§ 4. DETAILED DESCRIPTION

The present invention involves novel methods, apparatus and data structures for reusing information from previously executed control instructions for a data forwarding device, such as a router for example. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

§ 4.1 Exemplary Environments in which the Present Invention May Operate

§ 4.1.1 First Exemplary Data Forwarding Device

Figure 1:
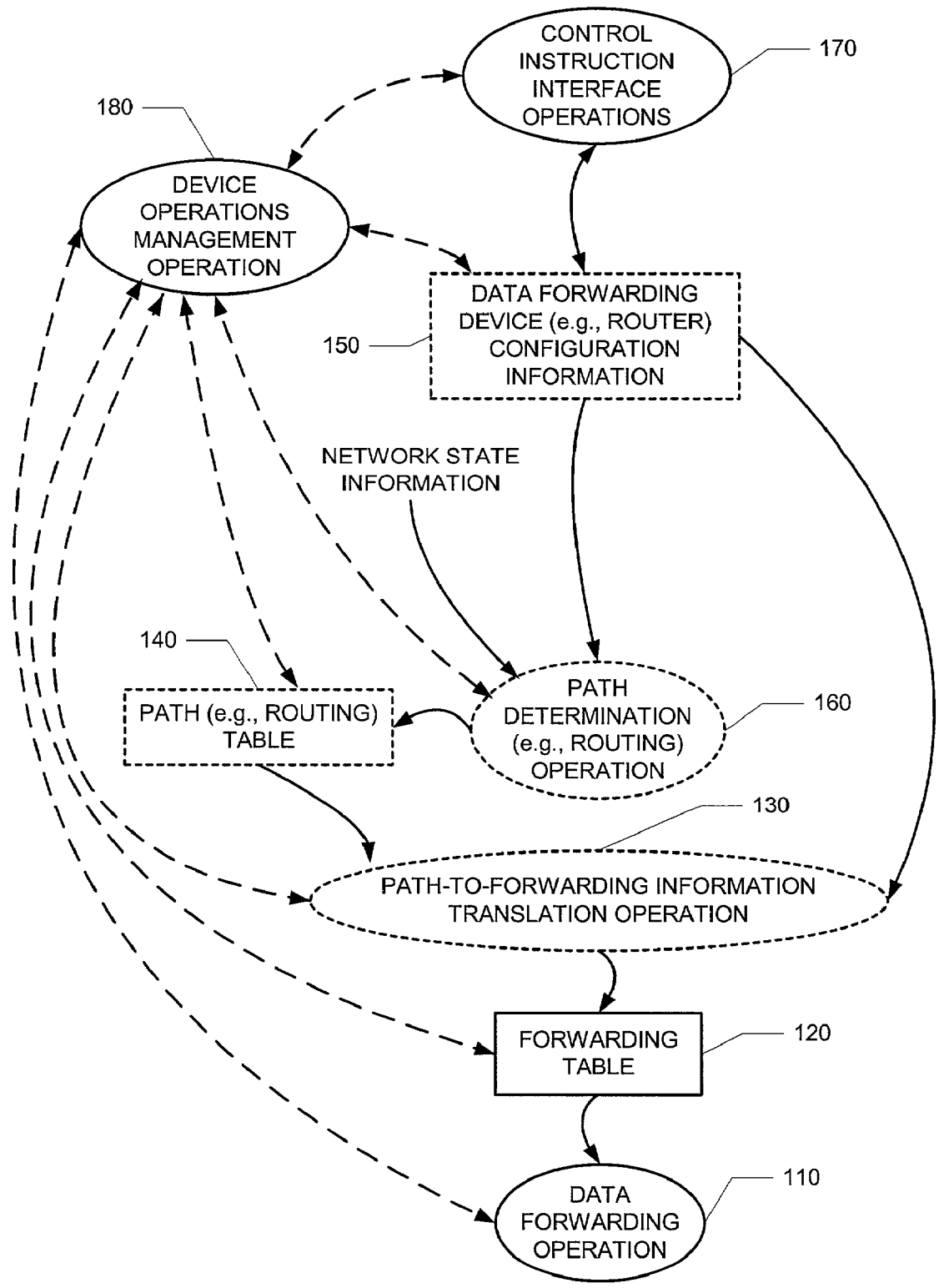
FIG. 1 is a high-level bubble chart diagram of a simple exemplary data forwarding device having a control instruction interface with which the present invention may be used.

FIG. 1 is a high-level bubble chart diagram of a simple exemplary data forwarding device 100. As shown, a data forwarding operation 110 may use information in a forwarding table 120 to forward incoming data (e.g., packets) towards a final destination. For a simple data forwarding device, only these components are needed. However, in many data forwarding devices, the forwarding table 120 may be generated and updated by an optional (as indicated by phantom lines) path-to-forwarding information translation operation 130. The path-to-forwarding information translation operation 130 may perform its generation and update functions based on an optional (as indicated by phantom lines) path (e.g., routing) table 140 and device configuration information 150. The path (e.g., routing) table 140 may be generated by an optional (as indicated by phantom lines) path (e.g., route) determination operation 160 based on network state (e.g., link state) information, as well as device configuration information 150. For example, the path determination operation 160 may operate in accordance with known routing protocols to populate a routing table.

A device operations management operation 180 may directly or indirectly interact with, and manage, some or all of the operations just introduced as indicated by the dashed arrow lines. A user may use a control instruction user interface operation 170 for interacting with the device operations management operation 180, as well as the device configuration information 150. The present invention may concern at least a part of the control instruction user interface operation 170.

§ 4.1.2 Second Exemplary Data Forwarding Device

Figure 2:
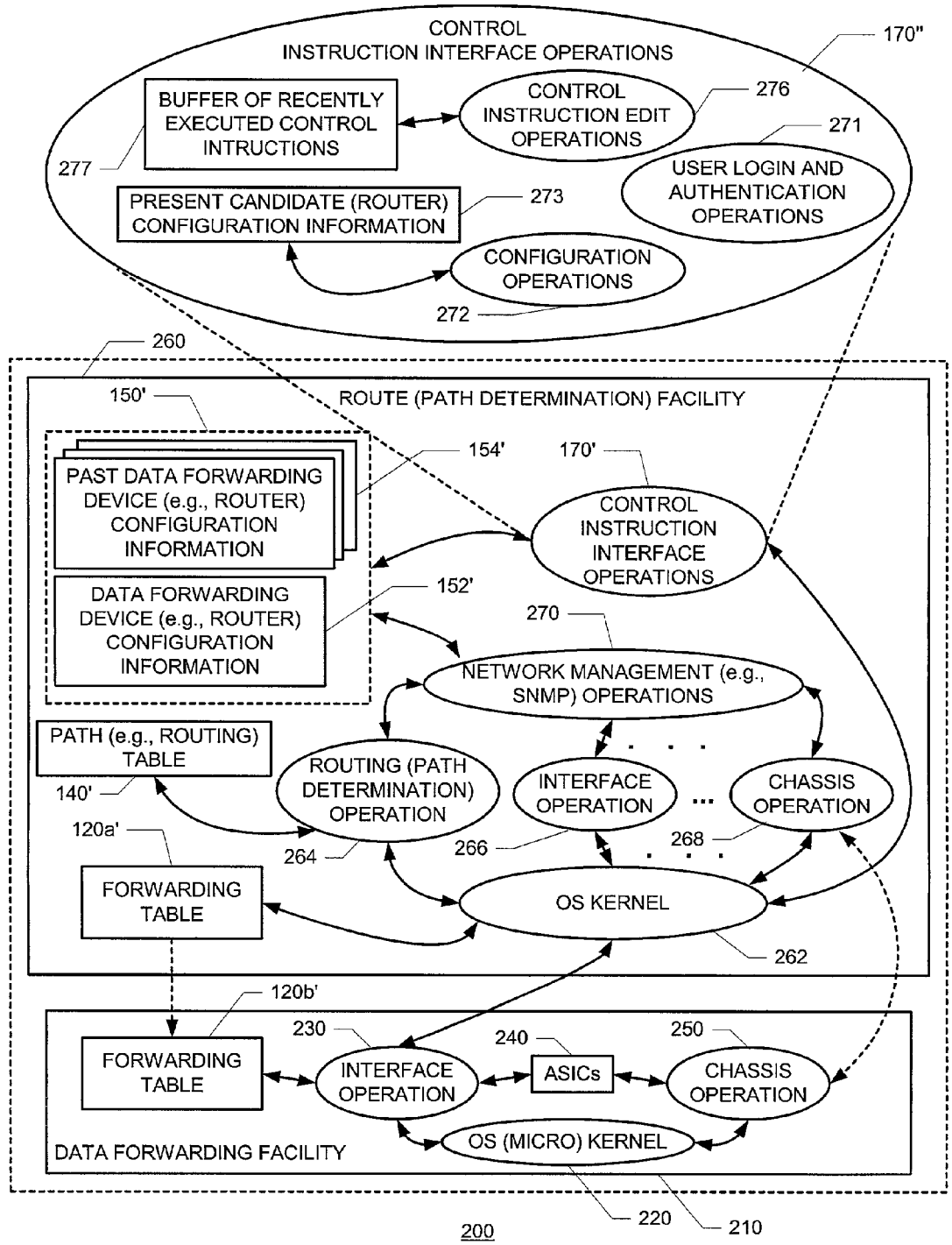
FIG. 2 is a high-level bubble chart diagram of an exemplary data forwarding device having a control instruction interface with which the present invention may be used.

FIG. 2 is a high-level bubble chart diagram of an exemplary data forwarding device 200. The data forwarding device 200 may include a data (e.g., packet) forwarding facility 210 and a path (e.g., route) determination facility 260. Basically, the data forwarding facility 210 may function to forward data towards its ultimate destination, and the path determination facility 260 may function to generate and/or update a forwarding table 120' based on path (e.g., route) determinations.

In an exemplary embodiment, the data forwarding facility 210 may include an operating system (micro) kernel 220 which supports various operations (e.g., an interface operation 230 and a chassis operation 250). The exemplary data forwarding facility 210 may also include an instance of a forwarding table 120b' used to forward data towards its destination. The forwarding table instance 120b' may correspond to an instance of the forwarding table 120a' of the path determination facility 260.

In an exemplary embodiment, the path determination facility 260 may include an operating system kernel 262 which supports various operations (e.g., a path (e.g., route) determination operation 264, an interface operation 266, a chassis operation 268, control instruction interface operations 170', etc.) and which may be used to generate the forwarding table instance 120a'. The path (e.g., route) determination operation 264 may be used to determine a path (e.g., routing) table 140'. Network management (e.g., SNMP) operations 270 may interact with the various operations 264,266,268 supported by the operating system kernel 262. The control instruction interface operation 170' may act on configuration information 150' and the operating system kernel 262.

As shown in the blow-up of bubble 170" in FIG. 2, the control instruction user interface operations 170' may include user login and authentication operations 271, configuration operations 272 and control instruction editing operations 276. In accordance with the present invention, the control instruction editing operations 276 may access recently executed (i.e., previously entered) control instructions stored (e.g., in a buffer 277).

In both the device 100 of FIG. 1 and the device 200 of FIG. 2, control instruction interface operations 170 and 170' are provided. The present invention may constitute a part of such a control instruction user interface operations 170/170'. The present invention may be used in other data forwarding devices.

§ 4.2 Functions that May be Performed by the Present Invention

The present invention may function to help users to input control instructions using fewer keystrokes, with less chance of typographic errors, and requiring less memorization (e.g., of instructions, parameter values, syntax rules, etc.) on the part of the user. The present invention may do so by permitting previously executed command instructions to be searched and/or by permitting a string to be expanded to match an alpha-numeric string, such as a word, or parameter for example, of a previously executed control instruction.

§ 4.3 Exemplary Operations, Architecture, Methods and Data Structures

Operations that may be performed by the present invention are introduced, exemplary methods and data structures that may be used to effect such operations, and exemplary hardware that may be used to effect such operations are described in the following.

§ 4.3.1 Exemplary Operations

Figure 3:
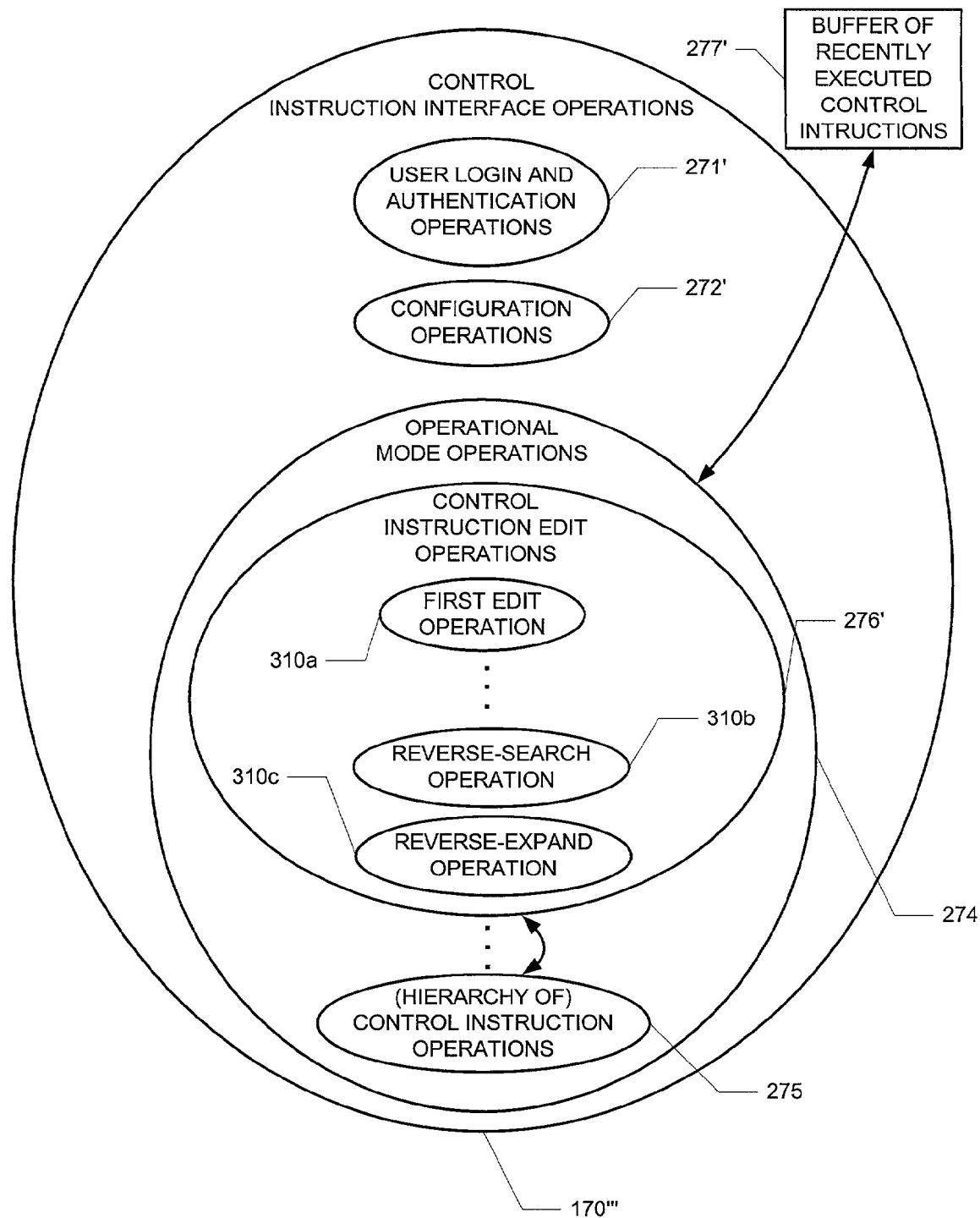
FIG. 3 is a high-level bubble chart diagram that illustrates control instruction interface operations of which the present invention may be a part.

FIG. 3 is a high-level bubble diagram that illustrates exemplary control instruction interface operations 170''', of which the present invention may be a part. As was the case in the exemplary embodiment of FIG. 2, the control instruction interface operations 170''' may include user login and authentication operations 271', configuration operations 272' and control instruction edit operations 276'. The control instruction edit operations 276' may be a part of operational mode operations 274. In addition to including control instruction edit operation 276', the operational mode operations 274 may include a number of control instruction operations (which may be simply referred to as "control instructions" or "instructions") 275.

In the context of a data forwarding device, such as a router for example, the control instruction operational mode operations 274 may (i) be accessible from a console or through a remote network connection, (ii) automatically start after the device finishes booting, (iii) be used to perform various tasks such as configuring operating system software, and monitoring and troubleshooting software, network connectivity, and/or hardware.

Figure 4:
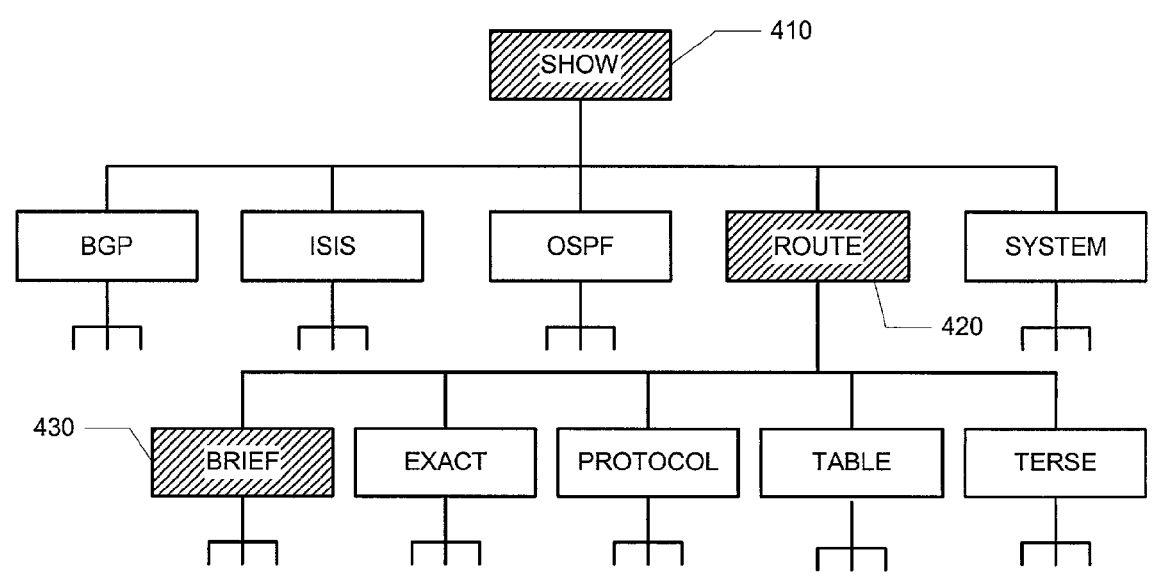
FIG. 4 is a block diagram that illustrates an example of hierarchical control instructions in a router.

The control instructions may be organized in a hierarchy, with control instructions that perform a similar or related function grouped together under the same higher level control instruction. For example, as illustrated in FIG. 4, all control instructions that display information about the system and the system software may be grouped under the "show" instruction 410, and all instructions that display information about the routing table may be grouped under the "show route" instruction 410/420. (Branches without control instruction nodes convey that the hierarchy may include further control instructions.)

To execute an instruction, the full instruction name, from top hierarchical level down, is entered. Thus, referring once again to FIG. 4, to display a brief view of the routes of a router table, the instruction "show route brief" 410/420/430 may be entered.

Some exemplary control instructions 275 that may be provided in the context of a data forwarding device, such as a router for example, are now introduced. Some control instructions 275 may control a user interface environment. For example, a "set" control instruction may be used to configure a display screen.

Some control instructions 275 may be used for monitoring and troubleshooting. For example, a "clear" control instruction may be used to clear statistics and protocol database information, a "monitor" control instruction may be used to perform real-time debugging of various software components (e.g., routing protocols and interfaces), a "ping" control instruction may be used to determine whether a remote network host is reachable, a "show" control instruction may be used to display current configuration and information about interfaces, routing protocols, routing tables, routing policy filters and the chassis, a "test" control instruction may be used to test a configuration and application of policy filters and autonomous system path regular expressions, and a "trace route" control instruction may be used to trace a route to a remote network host.

Other control instructions 275 may be used for connecting to other network systems. For example, a "ssh" control instruction may be used to open secure shell connections, and a "telnet" control instruction may be used to open Telnet sessions to other hosts on the network.

Still other control instructions 275 may be used for copying files. For example, "file" and "copy" command instructions may be used to copy files from one location on the device to another, from the device to a remote system, or from a remote system to the device.

Some control instructions 275, such as a "restart" command instruction for example, may be used to restart various software operations, such as routing protocol 264, interface 266 and simple network management protocol 268.

A "request" control instruction 275 may be used to perform system-level operations, such as stopping and rebooting the data forwarding device, loading operating system software images, etc. A "start" control instruction 275 may be used to exit the control instruction interface operations 170''' and enter an operating system (e.g., UNIX) shell. A "configure" control instruction 275 may be used to enter configuration operations 272'. A "quit" control instruction 275 may be used to exit the control instruction interface operations 170'''.

Such control instructions may be edited in accordance with control instruction edit operations 276'. Examples of control instruction edit operations 276 are moving a cursor, deleting characters, inserting (e.g., recently deleted) text, redrawing the screen, inserting previous control instructions, repeating keyboard sequences, scrolling up and down, searching, etc. As shown in FIG. 3, the control instruction edit operations may include a reverse-search operation 310b and a reverse-expand operation 310c, as well as other edit control instructions operations 310a.

Figure 5:
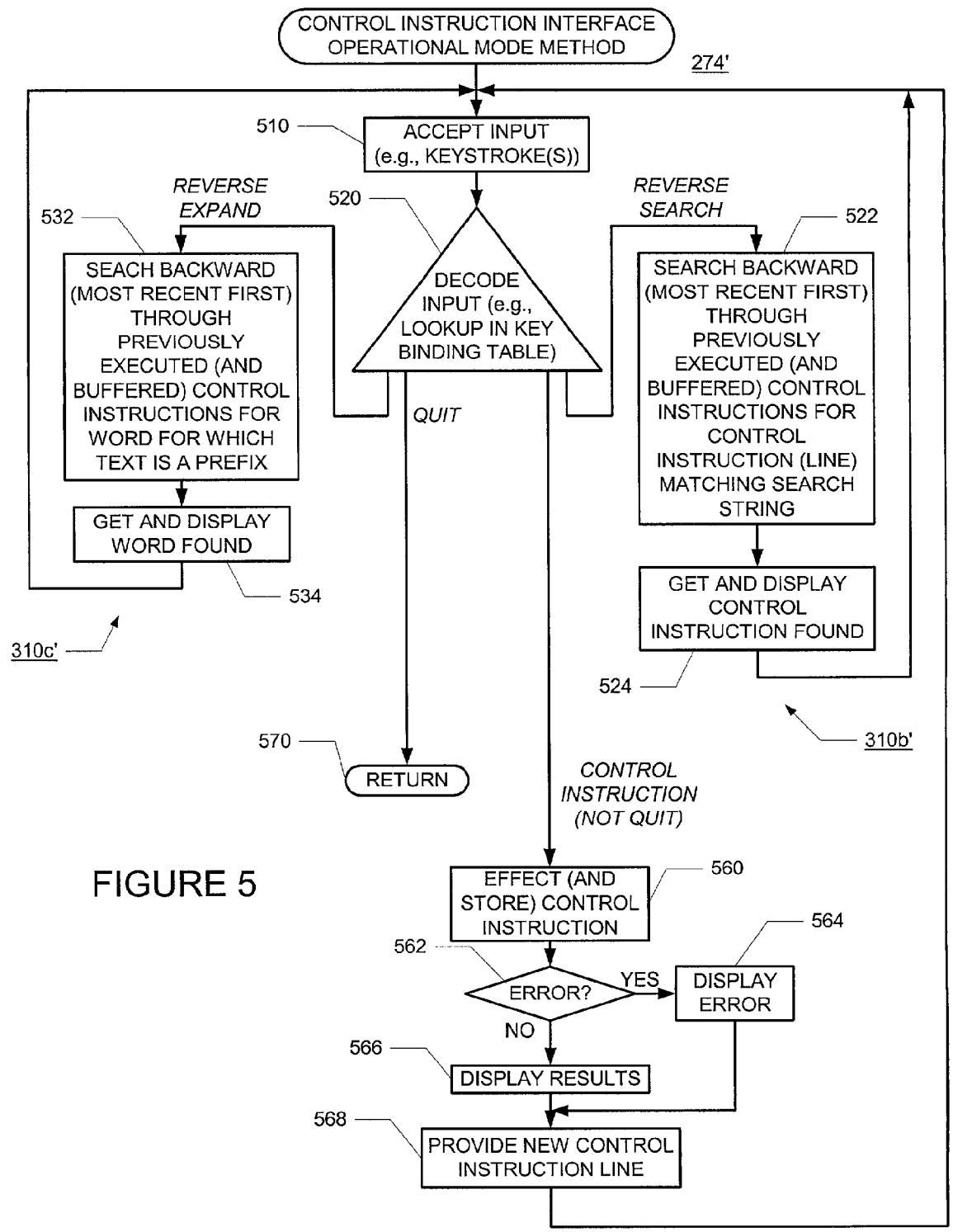
FIG. 5 is a high-level flow diagram of an exemplary method that may be used to effect at least some control instruction interface operational mode operations.

§ 4.3.2 Exemplary Methods and Data Structures for Reverse-Search and Reverse-Expand Operations FIG. 5 is a high-level flow diagram of an exemplary method 274' that may be used to effect control instruction interface operational mode operations 274. As depicted in block 510 input (e.g., a keystroke) is accepted. Collectively, these inputs can correspond to control instructions in general, as well as control instruction edit operations 274 more specifically.

Referring to decision branch point 520, the input is decoded (e.g., by a lookup in a key binding table). If the decoded input indicates a "reverse search" request, a search back through previously executed and stored (e.g., buffered) control instructions for a control instruction (line) matching a search string is performed, as indicated by block 522. The control instruction found is retrieved and displayed as indicated in block 524. The method 274' then branches back to block 510. As can be appreciated, collectively, decision branch point 520, and blocks 522 and 524 illustrate an exemplary reverse-search method 310b'. In one embodiment, a reverse-search may be requested by a CONTROL-r key input. After such a reverse-search is requested, each subsequent keystroke forms a string which may be dynamically matched with the most recently entered matching control instruction. Alternatively, or in addition, a reverse-search hop may be requested by a CONTROL-/ key input. With each reverse-search hop request, a search continuing back through the previously executed and stored control instructions (for a control instruction matching the then existing string) may be effected.

As will be appreciated from the description of elements 540 through 568 below, the retrieved control instruction may be effected (e.g., using the ENTER key). Alternatively, the command instruction can be edited before it is entered.

Referring once again to decision branch point 520, if the decoded input indicates a string (e.g., parameter) expansion (also referred to as a reverse-expand operation) request, as indicated by block 532, a search back through previously executed and stored (e.g., buffered) strings, which may be a part or a parameter of a previously executed and stored control instruction, for a string or word matching a search string is performed. The word found is retrieved and displayed as indicated in block 534. The method 274' then branches back to block 510. As can be appreciated, collectively, decision branch point 530, and blocks 532 and 534 illustrate an exemplary reverse-expand method 310c'. In one embodiment, a reverse-expand may be requested by a ESCAPE-/ key input. Successive searches continuing back through the previously entered and stored words or terms (e.g., parameters, operands, etc.) may be effected by repeatedly requesting a reverse-expand. Alternatively, or in addition, subsequent keystrokes (e.g., prior to an ENTER keystroke) may be used to lengthen the string upon which the reverse-expand may operate. Further, an ESCAPE-r key sequence may be used to dynamically (i.e., with each successive keystroke) search back through the previously entered and stored words or terms (e.g., operands, parameters, etc.).

Referring back to FIG. 3, although reverse-search, reverse-expand, and other editing operations were described as a part of operational mode operations 276', note that all of these edit methods may also be used in the context of editing a configuration file, for example, and can therefore work with the configuration operations 272'.

In one embodiment of the reverse-expand method, a particular type of words (e.g., particular parameters, or particular classes of parameters) can be searched, while others may be ignored. For example, a particular keyboard sequence may expand user input, but only to Internet protocol address parameters—another particular keyboard sequence may expand a user input, but only to physical interface type parameters, etc.

The reverse-expand operation 310c' may be limited to checking matches to "leading" strings, in which case the string input by the user is expanded to a string (e.g., a word or parameter) of the previously executed control instructions for which the input string is a prefix. Alternatively, the reverse-expand operation 310c' may be used to find matches to strings without regard to their location within a previously executed command instruction, such as within a continuous alpha-numeric string of a previously executed command instruction.

Other control instruction edit methods may be carried out. Further, other control instruction operations 275 of the operational mode operations 274 may be carried out. Referring back to decision branch point 510, it may be determined whether or not a control instruction was entered (e.g., whether or not the ENTER key is depressed), for example as the input at block 510. If a "Quit" control instruction is entered, the method 274' may be left via RETURN node 570. If, on the other hand, the control instruction that was entered was not the "Quit" command, then the method 274' may branch to block 560 where the entered control instruction is executed. At this point, the entered control instruction may be stored (e.g., buffered 277') as a previously executed command instruction. The method 274' may then continue to decision branch point 562.

At decision branch point 562, it may be determined whether or not the executed control instruction resulted in an error. If so, as indicated by blocks 564 and 568, an error may be displayed and a new control instruction line may be provided, respectively, before the method 274' branches back to decision branch point 510. If, on the other hand, no error results, as indicated by blocks 566 and 568, the results of the executed command operation are displayed and a new control instruction line may be provided, respectively, before the method 274' branches back to block 510.

Note that the key bindings (e.g., CONTROL-r, ESCAPE-/, etc.) were presented for illustrative purposes only. Clearly, other key bindings could be used to initiate the operations described above.

§ 4.3.3 Exemplary Hardware Architectures

Figure 6:
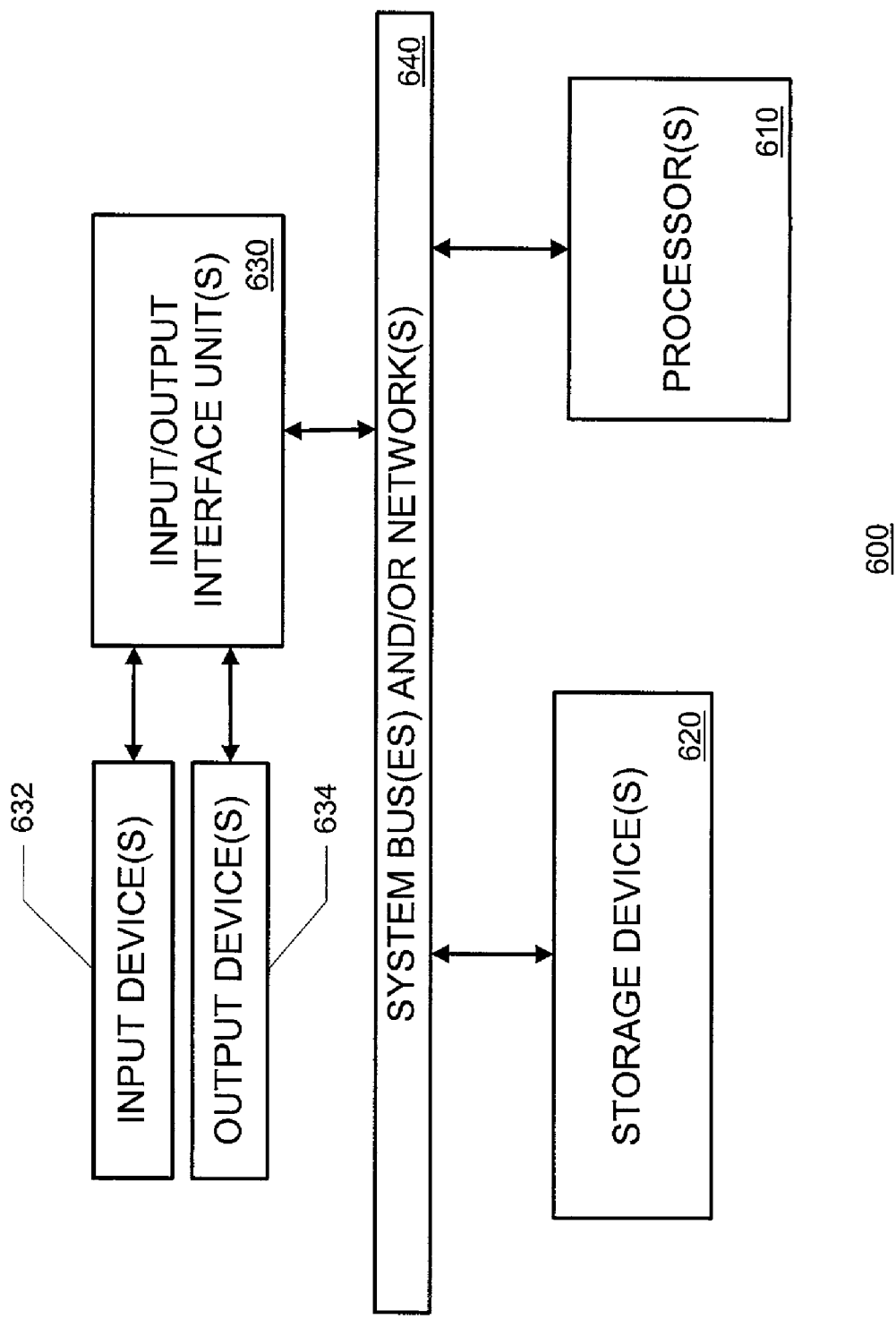
FIG. 6 is a high-level block diagram that illustrates an exemplary machine that may be used to effect various operations of the present invention.

FIG. 6 is high-level block diagram of a machine 600 which may effect one or more of the operations, and store one or more of the data structures, discussed above. The machine 600 basically includes a processor(s) 610, an input/output interface unit(s) 630, a storage device(s) 620, and a system bus(es) and/or a network(s) 640 for facilitating the communication of information among the coupled elements. An input device(s) 632 and an output device(s) 634 may be coupled with the input/output interface(s) 630. Operations of the present invention may be effected by the processor(s) 610 executing instructions. The instructions may be stored in the storage device(s) 620 and/or received via the input/output interface(s) 630. The instructions may be functionally grouped into processing modules.

The machine 600 may be a router for example. In an exemplary router, the processor(s) 610 may include a microprocessor and/or (e.g., custom) integrated circuit(s). In the exemplary router, the storage device(s) 620 may include ROM, RAM, SDRAM, SRAM, SSRAM, DRAM, flash drive(s), hard disk drive(s), and/or flash cards. At least some of these storage device(s) 620 may include program instructions defining an operating system, a protocol daemon, and/or other daemons. In a preferred embodiment, the methods of the present invention may be effected by a microprocessor executing stored program instructions. At least a portion of the machine executable instructions may be stored (temporarily or more permanently) on the storage device(s) 620 and/or may be received from an external source via an input interface unit 630. Finally, in the exemplary router, the input/output interface unit(s) 630, input device(s) 632 and output device(s) 634 may include interfaces to terminate communications links. The input device(s) 632 may include a keyboard.

Naturally, the operations of the present invention may be effected on systems other than routers, or on routers other than the exemplary router. Such other systems may employ different hardware and/or software.

§ 4.4 Operational Examples in Exemplary Embodiments

Operational examples of a reverse-search operation and of a reverse-expand operation are described below.

§ 4.4.1 Operational Examples of Reverse-Search Operation

In the following example, assume that the following control instructions were entered (and therefore executed) in the order shown:

>show route table
>show route protocol
>show route exact
>show route terse

Further assume that these previously executed control instructions are saved (e.g., in a buffer). Finally, assume that a reverse-search is effected by a ctrl-r keyboard sequence.

If a user were to input the following keyboard sequence:
ctrl-r sh the first matching control instruction, namely:
show route terse would be returned. If the user further input an additional:
ow route e keyboard sequence, the next matching control instruction, namely:
show route exact would be returned.

If the user instead input the following keyboard sequence:
ctrl-r show route t the first matching control instruction, namely:
show route terse would be returned. If the user further input reverse-search hop:
ctrl-/ keyboard sequence, the next matching control instruction, namely:
show route table would be returned § 4.4.2 Operational Example of Reverse-Expand Operation In the following example, assume that the following control instructions were entered (and therefore executed) in the order shown:

>set system host-name router-sj1
>set system static-host-mapping router-sj1 inet 192.168.1.77
>set system static-host-mapping router sj1 alias sj1
>set system static-host-mapping router sj1 sysid 1921.6800.1077

Further assume that these previously executed control instructions are saved (e.g., in a buffer). Finally, assume that a reverse-search is effected by an Esc-/ keyboard sequence.

If a user were to input the following keyboard sequence:
ping 68Esc-/

The following would be returned:
ping 1921.6800.1077

If the user were to input the following keyboard sequence:
Esc-/ again, the following would be returned:
ping 192.168.1.77

Notice that only (discrete) words or strings are searched and only words or strings are returned in this exemplary embodiment. In the foregoing example, the reverse-expand located a matching string at any place in the previously executed control instructions. In an alternative embodiment, only leading-edge matches are found. In such an alternative only an expansion of "1", "19", or "192" would return the two parameters illustrated above.

Note that in one embodiment, a particular keyboard sequence could selectively expand a string to match only a particular parameter, such as an internet protocol address for example.

§ 4.5 CONCLUSIONS

As can be appreciated from the foregoing disclosure, the present invention helps users to enter control instructions using fewer keystrokes, with less chance of typographical errors, and with less memorization (e.g., of instructions, parameter values, syntax rules, etc.) required on the part of the user. The present invention permits previously executed command instructions to be reused. The present invention also permits a string to be expanded to match a word, such as a parameter of a previously executed control instruction for example.

What is claimed is:

1. A method for inputting a word or parameter value of a control instruction for a data forwarding device, the method comprising:
   a) accepting user input, the user input including a first part, a second part comprising a search string, and a third part;
   b) determining, with the data forwarding device, whether a reverse-expand is requested based on the third part of the user input accepted; and
   c) if it is determined that a reverse-expand is requested, then
      i) searching, with the data forwarding device, back through previously entered and stored data forwarding device control instructions for a data forwarding device control instruction having a word or parameter value, at least a part of which matches the search string of the second part of the user input,
      ii) retrieving, with the data forwarding device, a first matching word or parameter value, and
      iii) rendering a command line including the first part of the user input and the first matching word or parameter value,
   wherein the data forwarding device is one of (A) a network switch and (B) a network router, and wherein the command line rendered includes the first part of the user input followed by the first matching word or parameter value.

2. A control instruction interface for use in a data forwarding device, the control instruction interface comprising:
   a) a storage device for storing previously entered data forwarding device control instructions;
   b) an input device for accepting user input; and
   c) a reverse-expand facility, the reverse-expand facility adapted to
      i) accept user input from the input device, the user input including a first part, a second part comprising a search string, and a third part,
      ii) determining whether a reverse-expand is requested based on the third part of the accepted user input, and
      iii) if it is determined that a reverse-expand is requested, then searching back through the previously entered data forwarding device control instructions stored in the storage device for a data forwarding device control instruction having a word or parameter, at least a part of which matches the search string of the second part of the user input, and
      iv) generating a command line including the first part of the user input and a first matching word or parameter,
   wherein the data forwarding device is one of (A) a network switch and (B) a network router, and wherein the command line includes the first part of the user input followed by the first matching word or parameter.

3. A method for inputting a word or parameter value of a control instruction for a data forwarding device, the method comprising:
   a) accepting user input, the user input including a first part, a second part comprising a search string, and a third part;
   b) determining, with the data forwarding device, whether a reverse-expand is requested based on the third part of the user input accepted; and
   c) if it is determined that a reverse-expand is requested, then
      i) searching, with the data forwarding device, back through previously entered and stored data forwarding device control instructions for a data forwarding device control instruction having a word or parameter value, at least a part of which matches the search string of the second part of the user input,
      ii) retrieving, with the data forwarding device, a first matching word or parameter value, and
      iii) rendering a command line including the first part of the user input and the first matching word or parameter value,
   wherein the data forwarding device is one of (A) a network switch and (B) a network router, wherein the reverse-expand is specific to a given parameter, and
   wherein the act of searching back through previously entered and stored data forwarding device control instructions for a data forwarding device control instruction having a word or parameter value, at least a part of which matches the search string of the second part of the user input further determines whether the word or parameter value belongs to the given parameter to qualify the search string match.

4. A method for inputting a word or parameter value of a control instruction for a data forwarding device, the method comprising:
   a) accepting user input, the user input including a first part, a second part comprising a search string, and a third part;
   b) determining, with the data forwarding device, whether a reverse-expand is requested based on the third part of the user input accepted; and c) if it is determined that a reverse-expand is requested, then
   i) searching, with the data forwarding device, back through previously entered and stored data forwarding device control instructions for a data forwarding device control instruction having a word or parameter value, at least a part of which matches the search string of the second part of the user input,
   ii) retrieving, with the data forwarding device, a first matching word or parameter value, and
   iii) rendering a command line including the first part of the user input and the first matching word or parameter value,
wherein the data forwarding device is one of (A) a network switch and (B) a network router, wherein the reverse-expand is specific to a given class of parameters, and
wherein the act of searching back through previously entered and stored data forwarding device control instructions for a data forwarding device control instruction having a word or parameter value, at least a part of which matches the search string of the second part of the user input further determines whether the word or parameter value belongs to the given class of parameters to qualify the search string match.

5. The method according to claim 4 wherein the given class of parameters is an Internet protocol address parameter.

6. The method according to claim 4 wherein the given class of parameters is a physical interface type parameter.

7. A method for inputting a word or parameter value of a control instruction for a data forwarding device, the method comprising:
   a) accepting user input, the user input including a first part, a second part comprising a search string, and a third part;
   b) determining, with the data forwarding device, whether a reverse-expand is requested based on the third part of the user input accepted; and
   c) if it is determined that a reverse-expand is requested, then
      i) searching, with the data forwarding device, back through previously entered and stored data forwarding device control instructions for a data forwarding device control instruction having a word or parameter value, at least a part of which matches the search string of the second part of the user input,
      ii) retrieving, with the data forwarding device, a first matching word or parameter value, and
      iii) rendering a command line including the first part of the user input and the first matching word or parameter value,
wherein the data forwarding device is one of (A) a network switch and (B) a network router, and wherein when reverse-expand is requested, the act of retrieving the first matching word or parameter, retrieves the first matching word or parameter without other parts of the command line in which it was found.

8. The method of claim 7 wherein the act of determining whether a reverse-expand is requested determines whether or not a predefined key sequence is input.

9. The method of claim 7 wherein the act of determining whether a reverse-expand is requested determines whether or not a predefined key is input.

10. The method of claim 7 wherein the act of searching back through previously entered and stored data forwarding device control instructions considers more recently executed data forwarding device control instructions before less recently executed data forwarding device control instructions.

11. The method of claim 7 further comprising:
   d) determining, with the data forwarding device, whether another reverse-expand is requested before a data forwarding device control instruction is executed; and
   e) if it is determined that another reverse-expand is requested before the data forwarding device control instruction is executed, then automatically
      i) starting at the control instruction having the first matching word or parameter value, searching, with the data forwarding device, back through previously entered and stored data forwarding device control instructions for another data forwarding device control instruction having a word or parameter value, at least a part of which matches a search string input by the user,
      ii) retrieving, with the data forwarding device, a next matching word or parameter value, and
      iii) rendering the next matching word or parameter value.

12. The method of claim 7 wherein the first matching word or parameter value of a data forwarding device control instruction is one of (a) a data forwarding device communications interface name, (b) a data forwarding device communications interface type, (c) a communications network address, (d) an internet protocol address, (e) a firewall parameter, (f) a network communications protocol, (g) a network communications policy parameter, (h) a data forwarding device configuration parameter, and (i) a part of a hierarchical control instruction.

13. The method according to claim 7 wherein the control instruction is a configuration command.

14. A control instruction interface for use in a data forwarding device, the control instruction interface comprising:
   a) a storage device for storing previously entered data forwarding device control instructions;
   b) an input device for accepting user input; and
   c) a reverse-expand facility, the reverse-expand facility adapted to
      i) accept user input from the input device, the user input including a first part, a second part comprising a search string, and a third part,
      ii) determining whether a reverse-expand is requested based on the third part of the accepted user input, and
      iii) if it is determined that a reverse-expand is requested, then searching back through the previously entered data forwarding device control instructions stored in the storage device for a data forwarding device control instruction having a word or parameter, at least a part of which matches the search string of the second part of the user input, retrieving, with the data forwarding device, the first matching word or parameter, and generating a command line including the first part of the user input and the first matching word or parameter, wherein the data forwarding device is one of (A) a network switch and (B) a network router, and wherein when reverse-expand is requested, the act of retrieving the first matching word or parameter retrieves the first matching word or parameter without other parts of the command line in which it was found.

15. The control instruction interface of claim 14 wherein the reverse-expand facility is further adapted to retrieve from the storage device, the first matching word or parameter.

16. The control instruction interface of claim 15 further comprising:
   d) a display device, the display device adapted to render the first matching word or parameter retrieved from the storage device by the reverse-expand facility adjacent to the first part of the user input.

17. The control instruction interface of claim 15 wherein the first matching word or parameter of a data forwarding device control instruction is one of (a) a data forwarding device communications interface name, (b) a data forwarding device communications interface type, (c) a communications network address, (d) an internet protocol address, (e) a firewall parameter, (f) a network communications protocol, (g) a network communications policy parameter, (h) a data forwarding device configuration parameter, and (i) a part of a hierarchical control instruction.

18. The control instruction interface according to claim 14 wherein the control instruction is a configuration command.

* * * * *